Nov. 18, 1941.    G. A. WOOD    2,263,202
MARINE DRIVE
Filed June 21, 1938    4 Sheets-Sheet 2

Inventor
Garfield A. Wood

By Howard L. Fischer
Attorney

Nov. 18, 1941.　　　　　G. A. WOOD　　　　　2,263,202
MARINE DRIVE
Filed June 21, 1938　　　　4 Sheets-Sheet 3

Inventor
Garfield A. Wood

By Howard Fischer
Attorney

Nov. 18, 1941.  G. A. WOOD  2,263,202
MARINE DRIVE
Filed June 21, 1938  4 Sheets-Sheet 4

Inventor
Garfield A. Wood
By Howard Fische
Attorney

Patented Nov. 18, 1941

2,263,202

UNITED STATES PATENT OFFICE 2,263,202

MARINE DRIVE

Garfield A. Wood, Algonac, Mich.

Application June 21, 1938, Serial No. 215,071

5 Claims. (Cl. 60—97)

My invention relates to a marine drive for connecting Diesel engines or other suitable sources of power supply to a drive shaft or series of drive shafts. This connection is designed to provide an extremely simple construction of light weight which will be of sufficient strength to perform the required functions thereof.

Heretofore ships have employed various types of mechanisms for driving the propeller shafts. Many modern ships have been equipped with means of producing electric current for operation of electric motors to operate the propellers. While this construction results in an extremely heavy mechanism and is not always extremely efficient, the use of electric motors is desirable because of the ease with which the propellers may be reversed for stopping the boat or controlling the same.

It is important where high speed engines are used to produce power that a reduction gear be provided between the high speed engine and the propeller or power shaft, especially is this so in boat propulsion or driving other relatively low speed devices. The conventional reduction gears add considerable weight to the combination of a power plant in general practice. However, in my design, little additional weight is necessary because of the multiplicity of power application contacts on the main gear. As this main gear forms the synchronizing means between the crank shafts of each engine for their proper function in this type of Diesel engine of the opposed piston type, considerable weight is thus saved and additional parts eliminated. The use of a main gear as shown, where the main shaft runs through the center of it and where the engine units are applied around this main gear, provides an excellent combination for the application of a suitable clutching means between the main shaft and the power unit.

It is the object of the present invention to provide a means of connecting a series of power units such as Diesel engines, for example, to a common propeller shaft or the like in such a way that the power units may be individually operated. Each power unit is connected to the propeller shaft by a drive mechanism so designed that any of the power units may be quickly disconnected from the propeller shaft. With this construction it is possible for me to provide a series of power units, some of which may operate in one direction, while others operate in the opposite direction. With this arrangement the power units tending to rotate the shaft in one direction may be quickly and easily disconnected from the shaft and power units tending to rotate the propeller shaft in the opposite direction may be simultaneously connected thereto. The rotation of the propeller shaft in one direction may in this way be quickly stopped and rotation in the opposite direction started. The boat thus equipped may be readily and quickly reversed in a simple and effective manner, power to rotate the propeller shaft in either direction being at any time readily available.

It is also a purpose of my invention to provide a construction embodying a series of power units which are detachably connected to a single rotatable shaft. These power units are preferably relatively light, high speed Diesel engines. It is understood that this type of engine, being more highly stressed, requires more attention and inspection than heavier type engines running at a lower speed. By means of my connection between the power units and the drive shaft, however, any motor may be quickly thrown out of operation when not operating properly, without stopping rotation of the propeller shaft, and may be inspected and repaired while the power or propeller shaft is being driven by the remaining motors connected thereto. Similarly, with motors of this type, spare motors may be provided which can be used to replace any motor not functioning properly so that the full power may be obtained in an extremely short period of time. This exchange of motors may be made by simply removing a few bolts holding an engine in place and by lifting this motor out of operating position and placing a motor in good repair in the place of the removed motor.

A further feature of my invention resides in a construction embodying a series of motors for driving one or more propeller shafts and to equip each motor with a detector means, thermostatic or otherwise, to provide an indication when the motor is not functioning properly. It will be seen that when a motor is connected to the drive shaft, the pistons therein will operate whether or not combustion is taking place, and therefore creates a drag upon the drive shaft. This detector may operate a light of one color, such as yellow when the engine is properly operating and may close a circuit to a light of a different color such as red when combustion is not taking place within the motor.

It is also a feature of my invention to provide if desired, a means of automatically disconnecting a motor from the drive or propeller shaft when the motor is not functioning properly. Thus if for any reason such as the failure of a feed line supplying fuel to any motor, combustion of any motor ceases, this motor will be automatically removed from service and the indicator will indicate that such action has taken place.

These and other objects and novel features of my invention will be more fully set forth in following specification and claims.

In the drawings forming a part of my specification:

Figures 1A, 1B, 1C and 1D constitute a diagrammatic plan view of series of power units, each series connected in tandem to a single drive shaft.

Figure 1:
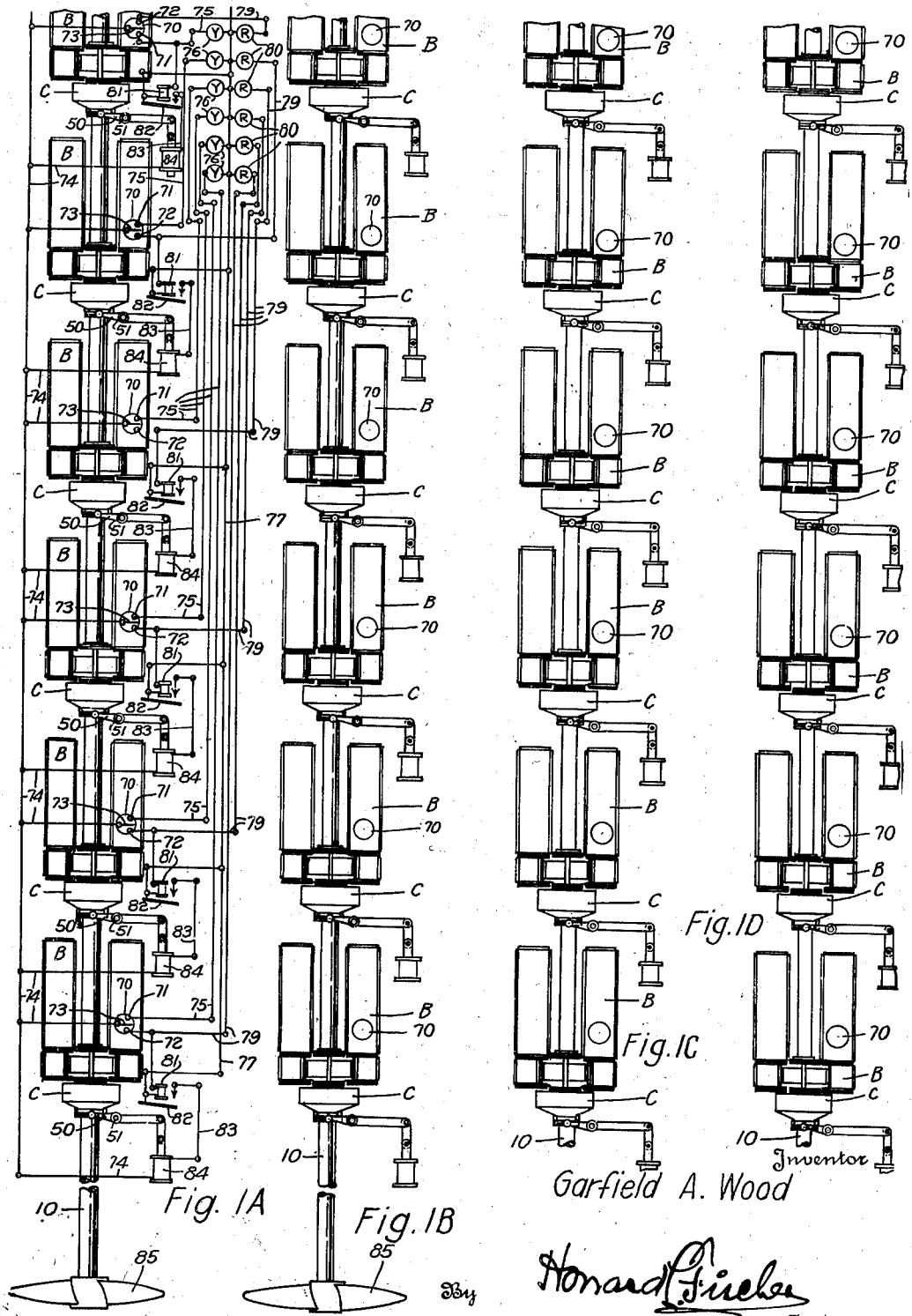
Figure 2:
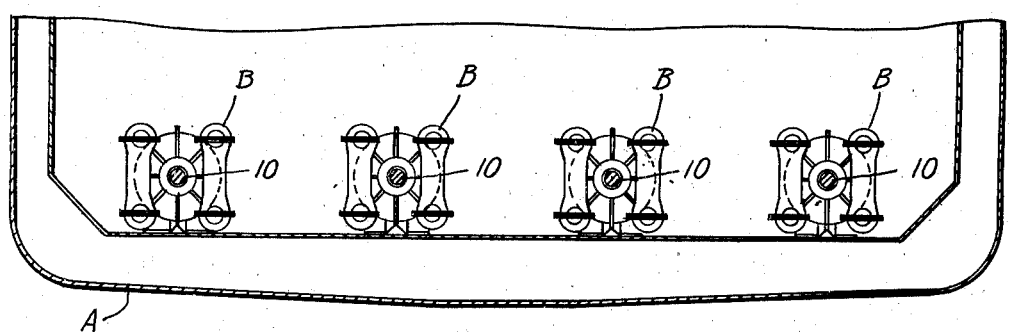
Figure 2 is a cross-sectional view diagrammatically through a boat, illustrating the position of the engines in Figure 1.
Figure 3:
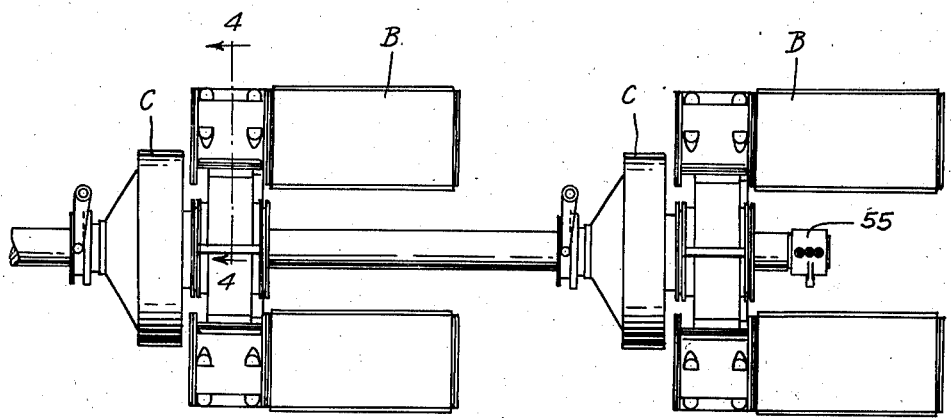
Figure 3 is a plan view of a pair of engines forming a part of my marine drive.

In Figure 1 of the drawings, I disclose a series of propeller shafts 10 arranged in parallel relationship within the boat A. Secured to the shafts 10 for operating these shafts, I provide a series of power units B which are secured to the shafts 10 in spaced relationship. The power units B are attached to the shafts 10 by means of a drive or clutch unit C. This clutch C permits each power unit to operate independently of every other power unit when its associated clutch is out of engagement with the shaft 10, and causes each power unit to be directly connected to the shaft 10 when its associated clutch is in positive engagement. Thus through the use of the proper clutch C it is possible for me to disengage any power unit from the shaft 10 and to stop the power unit, run the power unit at a higher or lower speed than the remaining power units, or to reverse the direction of rotation of the power unit in any desired manner as by reversing the direction of rotation of the cam shafts of the motors. Similarly, if one motor is not operating properly, the power unit of which it is a part may be disconnected from the shaft 10 by means of the clutch C and may be repaired or even removed and replaced without affecting the operation of the remaining motors.

Figure 5:
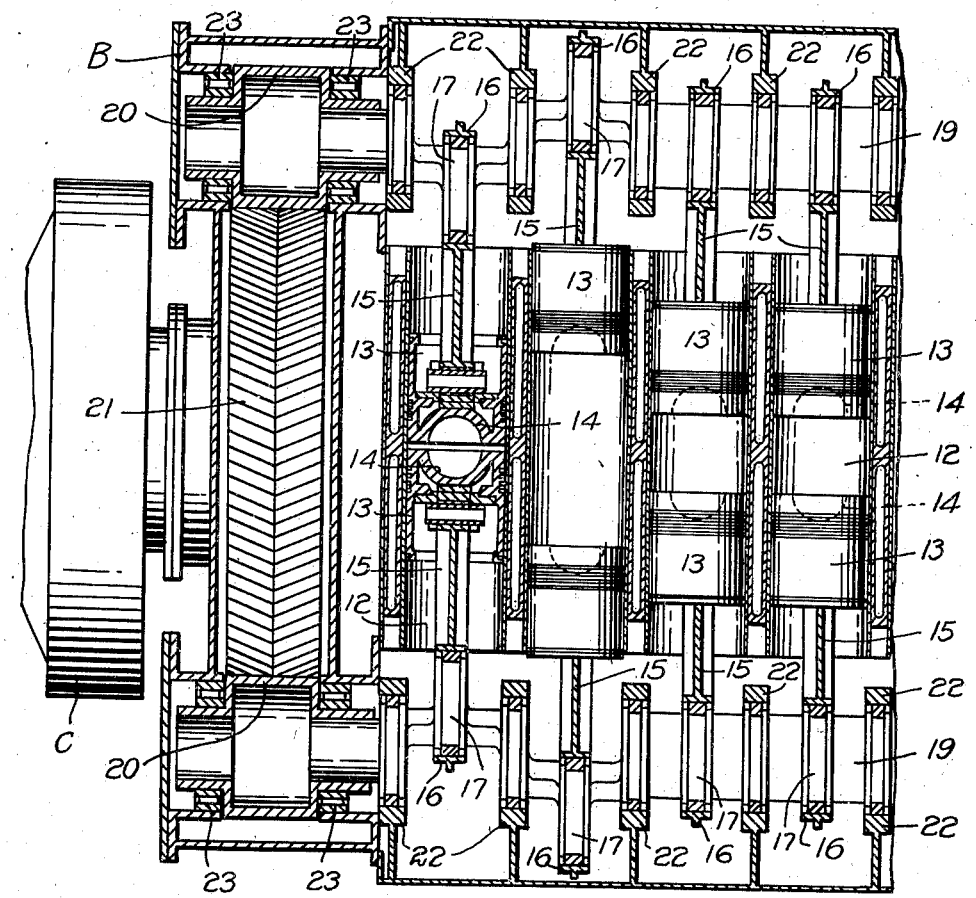
Figure 5 is a vertical section through one side of a power unit illustrating the manner in which the same is connected to the shaft.

While it is obvious that any desired type of motor may be used to comprise the power unit, I have illustrated the motor B as having cylinders 12, each containing two opposed pistons 13 having a concave end 14 thereupon. The pistons 13 are operated by connecting rods 15 having bearings 16 encircling eccentrics 17 mounted upon the crank shaft 19. The crank shafts 19 at each end of the cylinders 12 are synchronized so that the pistons 13 of each cylinder 12 arrive at the ends of their strokes simultaneously. Thus as illustrated in Figure 5 of the drawings, when the pistons 13 reach the extremity of their inward strokes, air will be compressed a sufficient amount to create heat necessary for combustion at the time fuel is injected into the heated or compressed air. The result being a power stroke of the pistons 13 and the rotation of the crank shafts 19 in the usual manner.

The crank shafts 19 are provided with a pinion 20 mounted thereupon designed to mesh with a gear 21 preferably of the herring-bone type, which is rotatable upon the shaft 10. The gear 21 positively engages the pinions 20 holding the crank shafts 19 properly synchronized so that the pistons 13 may not get out of proper timing. The crank shaft 19 is mounted in suitable bearings 22 of any convenient design. The gears or pinions 20 are supported upon roller bearings 23 in preferred embodiment.

Figure 4:
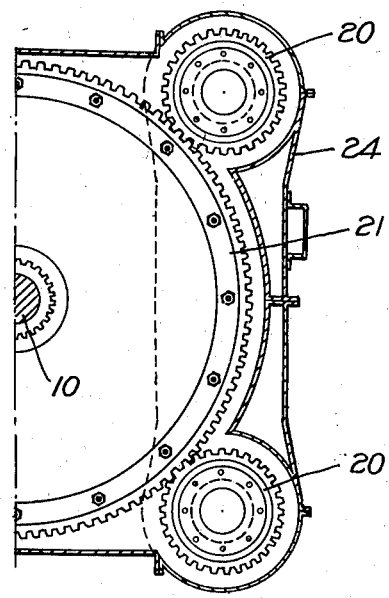
Figure 4 is a cross-sectional view taken on the line indicated by the line 4—4 of Figure 3.

The manner in which the pinions 20 engage the gear 21 is also clearly illustrated in Figure 4 of the drawings. In this figure the gears 20 and 21 are shown encased in a suitable gear casing 24, and the manner in which the opposed banks of double ended cylinders are connected in timed relation may be readily observed.

Figure 7:
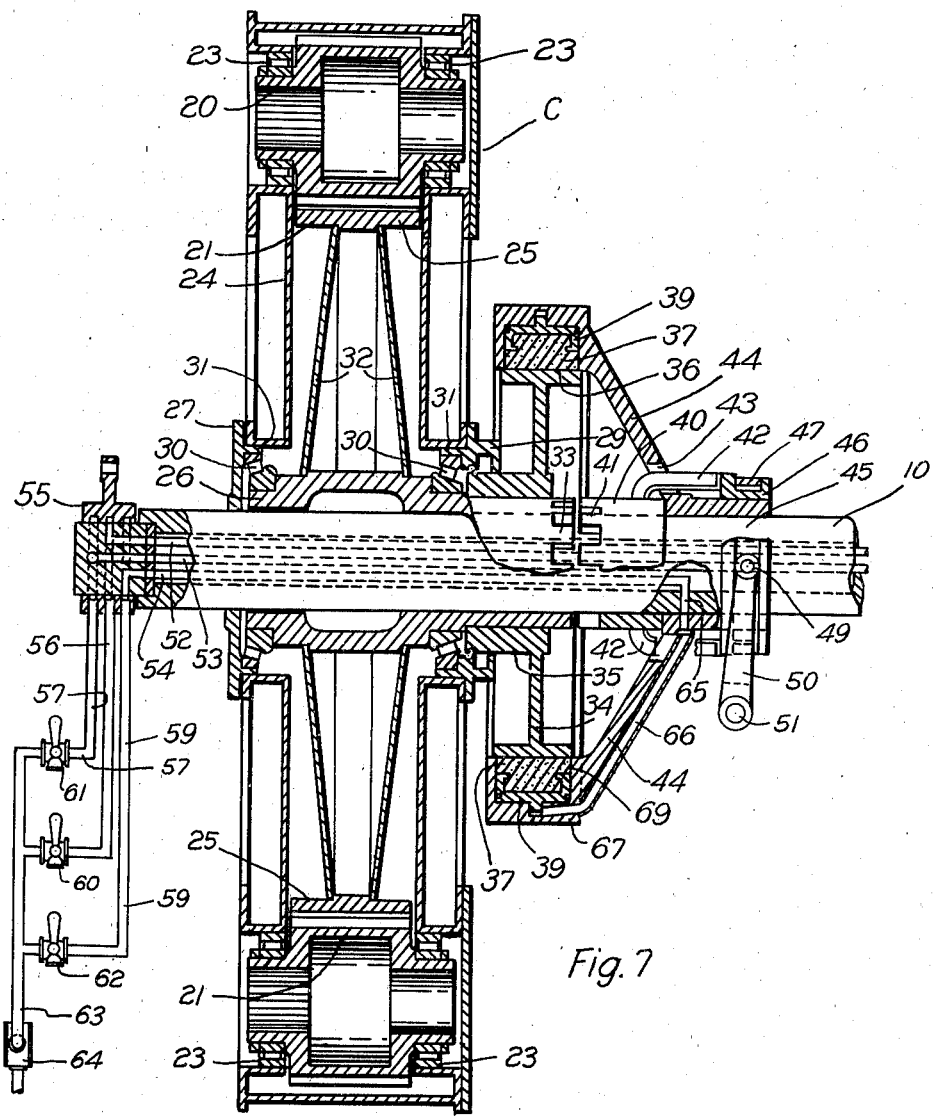
Figure 7 is a cross-sectional view through a clutch used in connection with my marine drive.

In Figure 7 of the drawings, may be seen a type of clutch suitable for use with the power units B. The construction of the gear 21 is clearly apparent in this figure. The gear 21 comprises an outer ring 25 having external teeth cut thereupon. A hub 26 encircles the shaft 10. The gear frame 24 is equipped with end plates 27 and 29. A roller bearing 30 is interposed between the hub 26 and an internal projection 31 of each casing end plate 27 and 29. The hub 26 is thus freely supported for rotation within the gear casing 24.

A pair of discs 32 are provided with central apertures to fit about the hub 26 and are welded between the hub 26 and the external ring 25 to connect these elements. The hub 26 continues beyond one side of the discs 32 a substantial distance and is provided with clutch teeth 33 in the end thereof.

A pulley 34 is provided with a hub 35 encircling the hub 26 and is secured for rotation with the hub 26. Against the external surface 36 of the pulley 34 blocks or plugs 37 of friction material are designed to bear. The blocks or plugs 37 are mounted upon pistons 39 movable in a radial direction. These pistons 39 may be forced inwardly by hydraulic pressure in a manner which will be hereinafter described. A sleeve 40 encircles the shaft 10 and is provided with clutch teeth 41 complemental to the clutch teeth 33 in the hub 26. The sleeve 40 is slidable along the shaft 10 and is prevented from rotation about the shaft 10 by a spline connection therewith or by arms 42 which extend through apertures 43 in the spider arms 44 secured to a sleeve 45. The sleeve 45 encircles the shaft 10 and is secured thereupon to rotate with the shaft. A channel member 46 is slidable on the external surface of the sleeve 45 and is connected by the arms 42 to the sleeve 40. A ring 47 or a pair of arms is pivotally connected at 49 to a clutch operating lever 50 pivoted to a fixed point 51. Obviously, when the lever 50 is pivoted to the left in an anticlockwise direction from the position indicated in Figure 7, the channel 46 is slidably moved over the sleeve 45 forcing the sleeve 40 to the left and causing the teeth 41 to engage the teeth 33 of the hub 26.

In order to control the pistons 39 I provide a series of longitudinal openings 52, 53, and 54 in the shaft 10. These openings or passageways are connected by a hydraulic commutator 55 to pipes 56, 57, and 59. These pipes are selectively controlled by control valves 60, 61, and 62 to a pipe line 63 connected to a pump 64 providing high pressure. By opening the valve 62, for example, oil is permitted to flow from the pipe 63, through the pipe 59, to the passage 54, which connects with an annular groove 65 extending about the shaft 10. This annular groove 65 is connected by the conduit 66 to a point between the pistons 39 and an enclosing and supporting ring 67 supported by the spider arms 44. In other words, the liquid under pressure is forced through the shaft 10 to a conduit 66 which permits the liquid under pressure to flow between the pistons 39 and the supporting enclosure 67 so as to force these pistons 39 inwardly away from the enclosure 67 supporting the cylinders 69 therefor. This action forces the plugs 37 of friction material against the outer surface of the pulley 34 to frictionally engage this pulley.

It may therefore be seen that the engine driving the gear 21 may be connected to the shaft by operation of the valve 62, which gradually forces the friction plugs 37 against the pulley 34 so as to cause rotation of the pulley 34 and consequently the hub 26 of the gear 21. When the pulley 34 is traveling at the same speed as the enclosure 67, the control lever 50 may be released by the solenoid 84 to cause engagement of the teeth 41 with the teeth 33, thus positively engaging the shaft 10 with the hub 26 of the gear 21.

It may be seen that my marine drive embodies a considerable number of power units B, all of which may be positively connected with the shafts 10 or all of which may be entirely free therefrom. In usual operation, it may be desirable to maintain all or a majority of the power units B in operation. I provide a simple means of indicating which of the motors are in proper operation and which of the motors are not functioning properly. Adjacent each of the motors I provide a thermostatically controlled element 70 having a pair of contacts 71 and 72. A heat responsive arm 73 is connected to a line wire 74 and is designed to engage the contact 71 when the motor is heated and to engage the contact 72 when the motor is cold. When the motor is operating properly, the combustion of the fuel therein will raise the temperature sufficiently to cause the heat responsive arm 73 to engage the contact 71. This closes a circuit from the line wire 74 through the arm 73, to the contact 71, and through a connecting wire 75 to a light 76 which may be green or yellow or any other desired color to indicate proper operation. The light 76 is connected to the opposite line wire 77.

When the motor is not operating properly, the heat responsive arm 73 will engage the contact 72, thereby closing a circuit from the line wire 74 through the arm 73, through the contact 72, through a wire 79, to a light 80 which is connected with the opposite line wire 77. Thus when the motor is not properly operating or is below a predetermined temperature one of the lights 80, corresponding to the motor upon which it is placed, will be illuminated.

I also may provide a means disconnecting any power unit B which is not operating properly. This means may comprise a magnetic coil 81 which is connected to the wire 79 and to the line wire 77. In the uppermost motor at the left of Figure 1, the connection of the coil 81 to wire 77 is through wire 75. When the motor is cold, a circuit is thereby closed from the line wire 74 through the heat responsive arm 73 and the contact 72, to the wire 79, through the coil 81 and to the line wire 77. The solenoid coil 81 is thereby energized when the motor is cold, pivoting the armature 82 thereof upwardly. A circuit is thereby closed from the line wire 77 through the armature 82 to a wire 83 extending through a solenoid coil 84 connected to the line wire 74. This energizes the solenoid 84, which pushes the lever 50, which is normally biased toward engaging position of the clutch, in a manner to disengage the clutch C thereby disengaging the power unit B from the shaft 10, the valves 60, 61 and 62 relieving the pressure within the clutch C.

I have disclosed the power units B connected to shafts 10 designed to rotate propellers 85. Obviously, the shafts 10 may be used to provide power for any type of device desired and the number of motors used to drive the same may be varied according to the requirements of each case. I also wish to point out that while I have illustrated a signal system used only on one row of motors, a similar signal system may be provided for each bank of motors in an identical manner. These have been omitted in order to make the showing less confusing.

Figure 6:
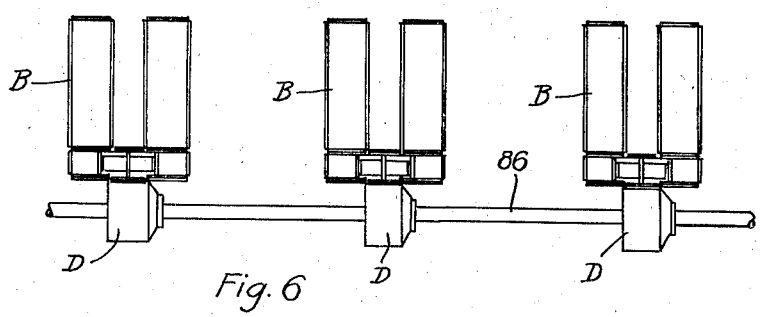
Figure 6 is a plan view of a modified arrangement of power units connected to a drive shaft.

It is not necessary that the power units B be connected to the shaft 10 as illustrated in Figure 1 of the drawings. In Figure 6 of the drawings I disclose power units B which are attached to a drive unit D of such a design that the motors are positioned at right angles to the position of the shaft 86, which corresponds to the shaft 10 in the prior showing. These drives D are so arranged that the motors may be connected and disconnected and provide a clutch so that the power units may be removed or reversed at will.

It may be seen that with my device all of the motors may be used at any time or that any part of the same may be in operation. In order to control the operation of a boat, for example, to best advantage, it may be desirable to disconnect several of the motors prior to the time the boat is to be stopped and to reverse these motors in any desired manner as by reversing the direction of rotation of the cam shafts of the motors so that a portion of the motors are operating in a reversed direction to the others. Then by proper operation of the clutch unit C, the motors tending to rotate the propeller shaft 10 in one direction may be quickly disengaged and the motors tending to rotate the shaft in the opposite direction may be virtually simultaneously engaged with the shaft to quickly stop rotation of the shaft and to cause rotation thereof in the opposite direction. My drive is thus extremely flexible and a boat equipped with this drive may be handled more easily and flexibly than any boat with which I am familiar equipped with Diesel power.

In accordance with the patent statutes I have described the principles of operation of my marine drive, and while I have endeavored to set forth the best embodiments thereof, I desire to have it understood that obvious changes may be made within the scope of the following claims without departing from the spirit of my invention.

I claim:

1. A power driving device comprising a series of power units spaced apart and including pairs of Diesel engines or the like each engine having a plurality of crank shafts, means for synchronizing the crank shafts, a power take-off shaft, clutch means acting to transmit the power from said synchronizing means to said power take-off shaft, means for indicating when any of said power units are not properly operating, and means automatically cutting out or releasing any of said power units not properly operating from said drive shaft.

2. A power driving device including a series of power units, each unit being composed of one or more pairs of light-weight Diesel engines wherein the pistons operate in unison to form the combustion chamber by compressing the fuel between the heads of the pistons, a plurality of crank shafts in each of said engines, a driving member for each of said power units adapted to connect the crank shafts of all of said engines to synchronize the same and to transmit power from said engines, a master drive shaft, clutch means interposed between each of said driving members and said drive shaft, whereby any or all of said power units may be quickly disconnected from said master shaft to permit any or all of said power units to be reversed in operation and again connected to said master shaft to operate the same in a reverse direction as is required of the propeller shafts in marine use.

3. A marine drive comprising a master propeller shaft, a series of bull gears co-axially mounted on said propeller shaft at spaced intervals, clutch means for releasably connecting said gears to said shaft, pairs of combustion engines each having common combustion chambers and a plurality of crank shafts and having their crank shafts synchronized by said bull gears mounted about said bull gears for easy replacement, and means for operating said clutch means collectively or selectively to drive said master propeller shaft in either direction by the reversing of any or all of said combustion engines.

4. A power driving device comprising a drive shaft, a series of reversible power units secured in longitudinal spaced relationship on said drive shaft, each of said units including a gear rotatable on said drive shaft, clutch means selectively connecting said gear to said drive shaft, and means engaging said gear at angularly spaced points to drive said gear, indicator means connected to each of said power units including indicator means for determining whether or not each power unit is in operation.

5. A marine drive including an elongated drive shaft, a series of clutches arranged in longitudinally spaced relation on said drive shaft, a gear secured to each of said clutches and rotatable around said drive shaft, said gears selectively rotatable with said drive shaft or with respect thereto, each of said power units including a pair of parallel engines, each of said engines including a pair of crank shafts, all of said crank shafts extending in parallel relationship, pinions on all of said crank shafts engaging said gear encircling said drive shaft, said pinions engaging said gear in angularly spaced relation about said gear encircling said drive shaft.

GARFIELD A. WOOD.